Feb. 20, 1923.
H. C. D. McGREW
EXCAVATING BUCKET
Filed Dec. 14, 1921
1,446,389
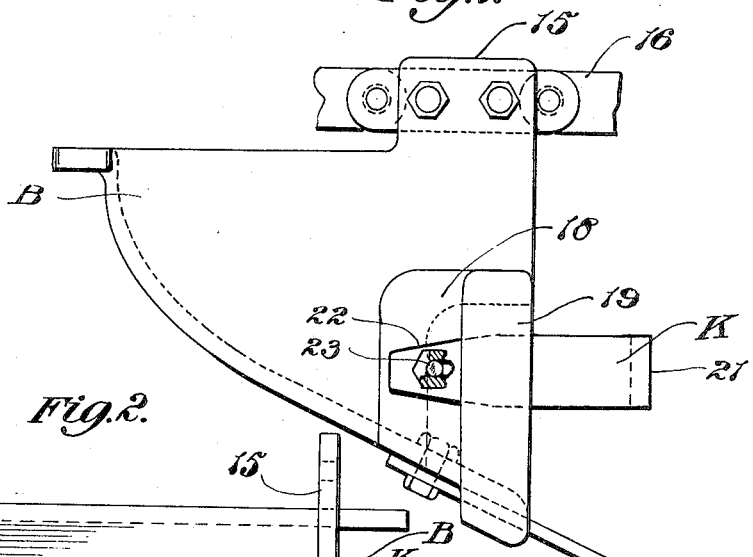
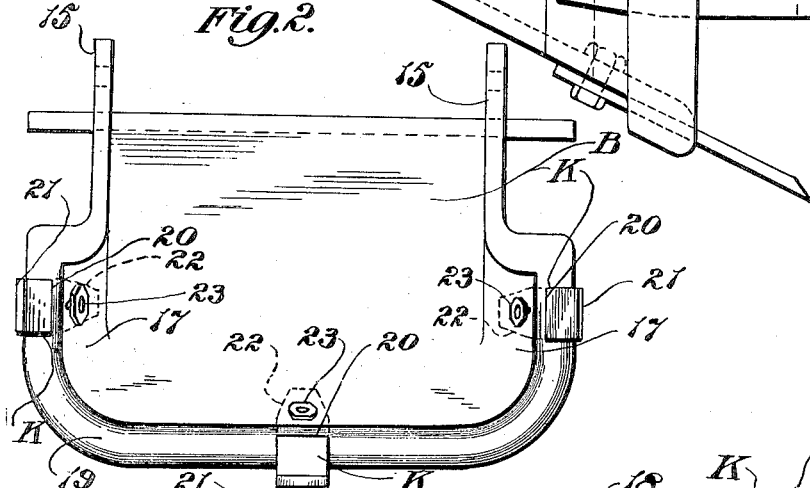
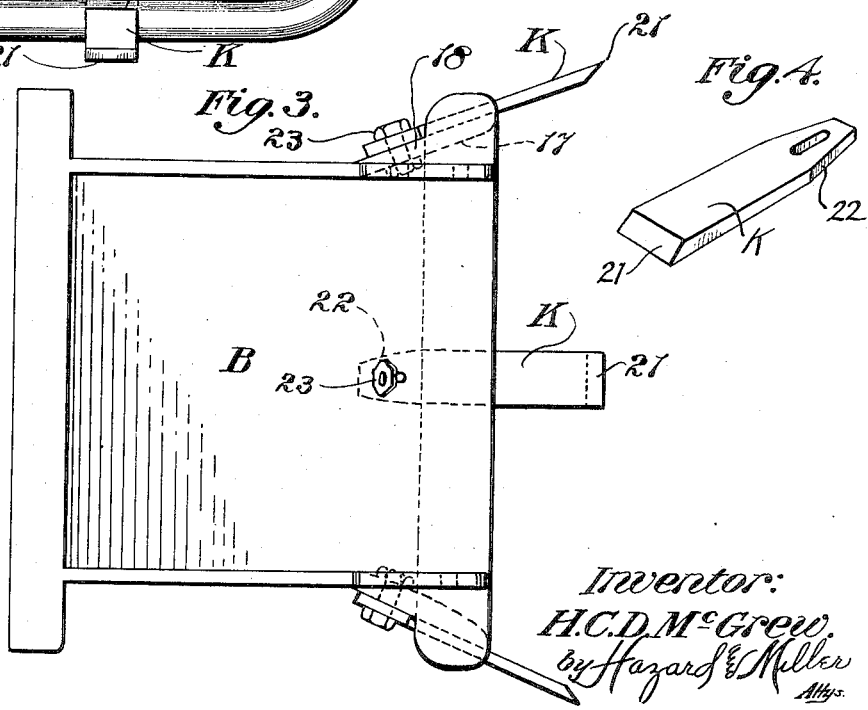
Inventor:
H.C.D. McGrew.
by Hazard & Miller
Attys.

Patented Feb. 20, 1923.

1,446,389

UNITED STATES PATENT OFFICE.

HENRY C. D. McGREW, OF LOS ANGELES, CALIFORNIA.

EXCAVATING BUCKET.

Application filed December 14, 1921. Serial No. 522,363.

*To all whom it may concern:*

Be it known that I, HENRY C. DEAN MC-GREW, a citizen of the United States, residing at Los Angeles, in the county of Los Angeles and State of California, have invented new and useful Improvements in Excavating Buckets, of which the following is a specification.

My invention relates to excavating buckets, and particularly, although not necessarily, to buckets used in trenching machines, a purpose of my invention being the provision of a bucket of this character which is constructed to removably and itnerchangeably sustain side and bottom cutters of such a construction that they are not liable to distortion when resharpening the same, whereby the proper operation of the buckets is at all times insured.

I will describe one form of bucket and one form of cutter, each embodying my invention and will then point out the novel features thereof in claims.

In the accompanying drawings,

Figure 1 is a view showing in side elevation one form of bucket and cutter each embodying my invention.

Fig. 2 is a view showing the bucket and cutters in front elevation.

Fig. 3 is a top plan view of the bucket and cutters.

Fig. 4 is a detail perspective view of one of the cutters shown in the preceding views.

Referring specifically to the drawings in which similar reference characters refer to similar parts, my invention, in its present embodiment, comprises a bucket designated generally at B and of the form shown, such bucket being formed at its upper edge with hanger ears 15 by means of which the bucket as a unit can be sustained upon an endless chain or belt 16. As clearly shown in Fig. 2, the mouth of the bucket is enlarged transversely as indicated at 17 for the purpose of providing offset heads 18 disposed at opposite sides of the bucket in the manner clearly shown in Fig. 3. The edge of the mouth portion of the bucket is provided on its outer side with a bead 19 which extends completely across the lower edge of the mouth and upwardly at the sides thereof with its ends terminating at the heads 18. At corresponding points in the side portions of the bead, sockets 20 are formed which extend completely through the bead to receive side cutters K. The cutters K have beveled cutting edges 21 and tapered shanks 22 which in their applied position contact with the outer sides of the heads 18, and with bolts 23 or other suitable form of fastening members extending through the shank and through the head for rigidly securing the cutter in adjusted position upon the bracket.

As shown in Fig. 4, the shank of each cutter is slotted to receive the bolt 23 thereby allowing of a longitudinal adjustment of the cutter to vary the position of its cutting edge with respect to the sides of the bucket as will be understood.

The horizontal portion of the bead 19 is also provided with one or more sockets 20 in which is mounted a shank of another cutter K, this cutter being adjustably secured within the socket in the same manner as the other cutters. However, in the present instance the socket is so formed that the shank of the cutter is extended beyond the bead and into contiguous relation with respect to the bottom of the bucket to allow the proper application of the bolt 23. The cutters at the sides of the bucket are termed side cutters, it being their function to effect the loosening of earth from the sides of a trench, while the cutter in the horizontal portion of the bead is a bottom cutter and serves to loosen the earth in the bottom of the trench.

In practice, the cutting edges 21 of all of the cutters K are offset with relation to the bottom and sides of the bucket, so that during the passage of the bucket through a trench they function to loosen the earth as above described, the bead 19 co-operating with the heads 18 and the bucket in providing a rigid support for the cutters so that they are firmly maintained in cutting position at all times. This arrangement permits of the use of flat cutters, such as those shown, and eliminates the necessity of employing cutters having curved shanks, so that in the resharpening of the cutting edge, there is no liability of the shank of the cutter being bent so as to alter the posititon of the cutting edge when the cutter is reapplied to the bucket. This naturally insures the cutting edges of the side cutters occupying corresponding positions with relation to the sides of the bucket, so that the two blades will cut the earth uniformly and thus prevent twisting of the bucket within a trench.

Although I have herein shown and described only one form of bucket and one form of cutter, each embodying my invention, it is to be understood that various changes and modifications may be made herein without departing from the spirit of the invention and the spirit and scope of the appended claims.

I claim as my invention:

1. An excavating bucket having a transversely enlarged mouth, and a bead on the sides and bottom of the mouth edge of the bucket having cutter receiving sockets formed therein.

2. In combination, a bucket, a transversely enlarged mouth, a bead on the mouth edge of the bucket having sockets formed therein, and flat cutters removably and adjustably received in said sockets.

3. In combination, a bucket, a transversely enlarged mouth, a bead on the mouth edge of the bucket having sockets formed therein, heads formed on the opposite sides of the bucket at the terminals of said bead, cutters having flat and linear shanks extending through said sockets with certain of the shanks engaging said heads, and means for adjustably securing the cutters on the bucket.

4. An excavating bucket having a bead on the mouth edge thereof formed with sockets adapted for the reception of cutters, and heads formed on the bucket rearwardly of the bead for the purpose described.

5. An excavating bucket having a bead on the mouth edge thereof formed of sockets adapted for the reception of cutters, and heads formed on the opposite sides of the bucket at the terminals of said bead for the purpose described.

6. In combination, a bead on the mouth edge of the bucket having sockets formed therein, heads formed on the opposite sides of the bucket at the terminals of said bead, cutters extending through the sockets of certain of the shanks engaging said heads, and means for adjustably securing the cutters on the bucket.

7. An excavating bucket having a bead on the mouth edge thereof formed with sockets adapted for the reception of cutters having flat and linear shanks.

In testimony whereof I have signed my name to this specification.

HENRY C. D. McGREW.